United States Patent
Martins Pereira et al.

(10) Patent No.: US 12,465,057 B2
(45) Date of Patent: Nov. 11, 2025

(54) EQUIPMENT AND METHOD FOR PROCESSING POULTRY PARTS

(71) Applicant: JOHN BEAN TECHNOLOGIES MÁQUINAS E EQUIPAMENTOS INDUSTRIAIS LTDA., Araraquara (BR)

(72) Inventors: Sérgio Renato Martins Pereira, Chapecó (BR); Bruno Luis Lise, Chapecó (BR)

(73) Assignee: JOHN BEAN TECHNOLOGIES MÁQUINAS E EQUIPAMENTOS INDUSTRIAIS LTDA., Araraquara (BR)

( * ) Notice: Subject to any disclaimer, the term of this patent is extended or adjusted under 35 U.S.C. 154(b) by 0 days.

(21) Appl. No.: 18/725,924

(22) PCT Filed: Jan. 5, 2023

(86) PCT No.: PCT/BR2023/050003
§ 371 (c)(1),
(2) Date: Jul. 1, 2024

(87) PCT Pub. No.: WO2023/130170
PCT Pub. Date: Jul. 13, 2023

(65) Prior Publication Data
US 2025/0072437 A1 Mar. 6, 2025

(30) Foreign Application Priority Data
Jan. 6, 2022 (BR) .......................... 1020220002223

(51) Int. Cl.
*A22C 21/00* (2006.01)

(52) U.S. Cl.
CPC ...... *A22C 21/0061* (2013.01); *A22C 21/0053* (2013.01)

(58) Field of Classification Search
CPC .................. A22C 21/0061; A22C 21/0053
(Continued)

(56) References Cited

U.S. PATENT DOCUMENTS 6,190,247 B1 * 2/2001 Reimer ................ A22C 29/021
452/1
6,283,848 B1 9/2001 Berry
(Continued)

FOREIGN PATENT DOCUMENTS

EP 3 599 874 B1 3/2021

OTHER PUBLICATIONS

International Search Report and Written Opinion mailed Jun. 6, 2023, issued in corresponding International Patent Application No. PCT/BR2023/050003, filed Jan. 5, 2023, 11 pages.

*Primary Examiner* — Richard T Price, Jr.
(74) *Attorney, Agent, or Firm* — Christensen O'Connor Johnson Kindness PLLC

(57) ABSTRACT

The present invention refers to an equipment (30) and a method for processing poultry parts (14a, 14b, 14c). The equipment (30) comprising: a conveyor belt (11) comprising; a plurality of recesses (12a, 12b, 12c), each recess (12a, 12b, 12c) being configured to receive a proximal part (13a, 13b, 13c) of the poultry part (14a, 14b, 14c), while allowing for a distal part of the poultry N parts (14a, 14b, 14c) to be processed, to remain free; the distal part of the poultry parts (14a, 14b, 14c) being processed by a set of bristles (21) associated with a rotative axis (22).

21 Claims, 15 Drawing Sheets

(58) Field of Classification Search
USPC .................................... 452/166, 167, 173
See application file for complete search history.

(56) References Cited

U.S. PATENT DOCUMENTS

| | | | |
|---|---|---|---|
| 7,566,260 B1* | 7/2009 | Griffiths | A22B 5/0082 |
| | | | 452/173 |
| 8,827,775 B2* | 9/2014 | Jefferson, Sr. | A22C 21/0053 |
| | | | 452/173 |
| 9,237,754 B1* | 1/2016 | Heemskerk | A22C 21/0061 |
| 2004/0009745 A1 | 1/2004 | Tsang | |
| 2013/0109286 A1 | 5/2013 | Jefferson, Sr. | |
| 2014/0349559 A1 | 11/2014 | Harben, III | |

* cited by examiner (State of the art)

(State of the art)

EQUIPMENT AND METHOD FOR PROCESSING POULTRY PARTS

FIELD OF THE INVENTION

The present invention refers, in a general manner, to an equipment configured for processing poultry cuts in a poultry processing line. In particular, the present invention relates to a modular equipment capable of processing poultry paws by means of the removal of the tissue affected by pododermatitis.

BACKGROUND OF THE INVENTION

The contact dermatitis, or contact eczema, is a cutaneous disease that manifests as an inflammatory reaction of the skin caused by direct contact with an external agent having allergenic or irritant potential. Specifically in veterinary practice, the contact dermatitis which affects the distal part of the paws (feet) of the animals, such as the footpad and at times the digital pads is called contact pododermatitis.

The pododermatitis is one of a group of dermatoses that are frequently diagnosed in animals. In broiler chickens, the etiology suggests that this cutaneous disease can also be connected to the genetic selection by poultry farmers for broiler chickens that present a high rate of growth and weight gain, to the deficiencies in the nutrition of these animals, the housing conditions of these animals, among other factors that can directly affect the immunologic system of the broiler chickens, making them more susceptible to the development not only of pododermatitis, but also of other diseases.

Regarding the housing conditions, it is observed that in an intensive farming system of broiler chickens wherein there is a high population density of birds, allied to bad ventilation practices and bad conditions for handling the bedding used in these breeding places, there is an environment that is propitious for the animals to be in direct contact with a humid bed deteriorated with compounds originating from the uric acid excreted in the urine and feces of these animals.

For this reason, the contact pododermatitis is known as ammonia burn, since the direct contact of these animals with said caustic compounds causes irritation of the skin and consequently, the development of an inflammatory response.

This inflammatory response can manifest in its initial phase as erythema, capable of evolving to skin hyperkeratosis. For this reason, the contact pododermatitis is also commonly called paw callus, which in its more severe form can cause rupture of the animal's skin, presenting ulcerative wounds which create an entry door for bacterial infections, particularly by the *Staphylococcus aureus* and *Escherichia coli* bacteria when the wound is in contact with fecal material. In this case, the pododermatitis can evolve to limb necrosis.

Thus, the contact pododermatitis in broiler chickens is a disease that can cause severe financial losses to the avian farmer, since its ulcerative phase is responsible for the deterioration of the animal's well-being, making it difficult to move and consequently, the ideal weight gain for slaughter.

As regards the current livestock market, China and a large part of Southeast Asia are the main importers and consumers of poultry paws for Brazilian livestock activity. The exported supply is submitted to sanitary norms and current quality standards. In this sense, it is a common practice of the avian market to assess the quality of the poultry paws in basically three classes:

Class A: Those that, when submitted to visual inspection do not present any type of abrasion and are considered fit for human consumption;

Class B: Those that, when submitted to visual inspection present light and moderate abrasions, but are still considered fit for human consumption, despite there being depreciation of the commercial value thereof; and Class C: Those that, when submitted to visual inspection present severe damages, being characterized as unfit for human consumption, and normally destined to rendering plants.

In this sense, there are several solutions presented in the state of the art of the avian industry which aim at the processing of poultry paws to remove tissue damaged by pododermatitis through the epidermal scarification of the affected area, to add more commercial value to the B and C class cuts.

A common practice can be verified from FIG. 1, which discloses a method and equipment to scarify poultry paws affected by pododermatitis. The equipment disclosed by FIG. 1 consists in a rotating abrasive material, confined in a protective box having slots for access to the abrasive material. This equipment further comprises an emergency stop button.

Despite comprising an emergency stop button, the equipment of the state of the art disclosed by FIG. 1 presents serious risks to the physical integrity of the operator, since the operating method consists in the manual insertion of the paws in contact with the abrasive material.

Additionally, it is evident that the manual operating method results in a slow and inefficient production rhythm when compared with the automated production methods, apart from generating serious risks of contamination of the processed product.

Further, another common practice of the state of the art can be verified from FIG. 2, which consists in a workstation comprising a manually operated scrubber, which selects the poultry paws in a foot treadmill, conducts a visual inspection and, if necessary, manually removes the affected tissue by means of the scrubber, whereby the hygiene is carried out through a constant waterflow at the place wherein the scrubber is located.

In view of the above, it is clear that the state of the art lacks technology innovations in the processing of poultry paws, particularly in the removal of the tissue affected by the pododermatitis.

It is also evident that the state of the art would benefit from an apparatus that is adaptable to an existing poultry processing line, which was compact, modular, automated, and safe to operators and the final consumer.

PURPOSES AND DESCRIPTION OF THE INVENTION

Thus, an objective of the present invention is to provide a modular equipment for processing poultry paws capable of eliminating or at least reducing the limitations of currently known techniques.

Additionally, it is an objective of the present invention to provide a versatile modular equipment, and which can be adapted and implemented in production lines having limitations in the workspace.

Further, the present invention has the purpose of providing a modular equipment that is efficiently able to remove the tissue damaged by pododermatitis, increasing productivity and the capacity of commercialization of the poultry cuts, particularly class B and C poultry paws, consequently increasing the profits of the avian producer while reducing waste.

It is also a purpose of the invention to provide a modular equipment which offers a high level of sanitary safety to the final product, as well as a high level of safety to the physical integrity of the operators of the modular equipment.

One or more purposes of the present invention, mentioned above, among others, is(are) reached by means of a modular equipment for processing poultry paws, comprising, at least:
 a lower module; and
 at least one upper module.

The lower and upper modules are mechanically associated by means of at least one support, wherein the at least one lower module comprises:
 a conveyor belt with adjustable speed; and
 a plurality of recesses.

Each recess being configured to receive a proximal part of the poultry cuts, such as a metatarsus comprising the poultry cuts to be processed, while allowing a distal part of the poultry cuts to remain free, and the modular equipment being configured for the continuous processing flow of the poultry cuts.

The modular equipment being additionally comprised to receive one or more operators, wherein the at least one upper module comprises:
 a set of bactericidal bristles associated to a rotating axis having adjustable rotating speed; and
 a stabilizer set comprising a stabilizer support configured to be in contiguity with the poultry cuts to be processed.

The stabilizer set being additionally configured to avoid direct contact between the one or more operators and the set of bactericidal bristles and avoid the ejection of the poultry cuts when in contact with the set of bactericidal bristles.

The set of bactericidal bristles and the stabilizer support comprising a set of tension springs configured to adapt the processing of poultry cuts having different sizes. The plurality of recesses and the set of bactericidal bristles comprising:
 a set of sprinkler nozzles, configured to sanitize the plurality of recesses and the set of bactericidal bristles.

BRIEF DESCRIPTION OF THE DRAWINGS

The purposes, technical effects and advantages of the present invention will be clear to the persons skilled in the art from the following detailed description which refers to the attached figures, which illustrate exemplary embodiments, but not limiting, of the objects claimed:

DESCRIPTION OF THE EMBODIMENTS OF THE INVENTION

Initially, it must be highlighted that the equipment, object of the present invention, will be described in accordance with particular, but not limitative embodiments, since the embodiments thereof can be carried out in different manners and variations according to the desired application.

In one embodiment, the present invention discloses a modular equipment 30 for processing poultry cuts 14a, 14b, 14c, particularly poultry paws, by means of the removal of the tissue affected by pododermatitis.

Additionally, it must further be noted that the expression "poultry cuts" must be understood as any cuts wherein the application of the modular equipment 30 of the present invention is possible.

Additionally, the expression "in contiguity" must be understood as being any distance variations between the mentioned parts, which may be in proximity or even in direct contact with each other.

Additionally, it is worth noting that the modular equipment 30 of the present invention is not limited only to the processing of poultry cuts 14a, 14b, 14c. Instead, it is evident to a person skilled in the art that the modular equipment 30 of the present invention can be applied to the processing of parts of other beef cattle.

Figure 1:
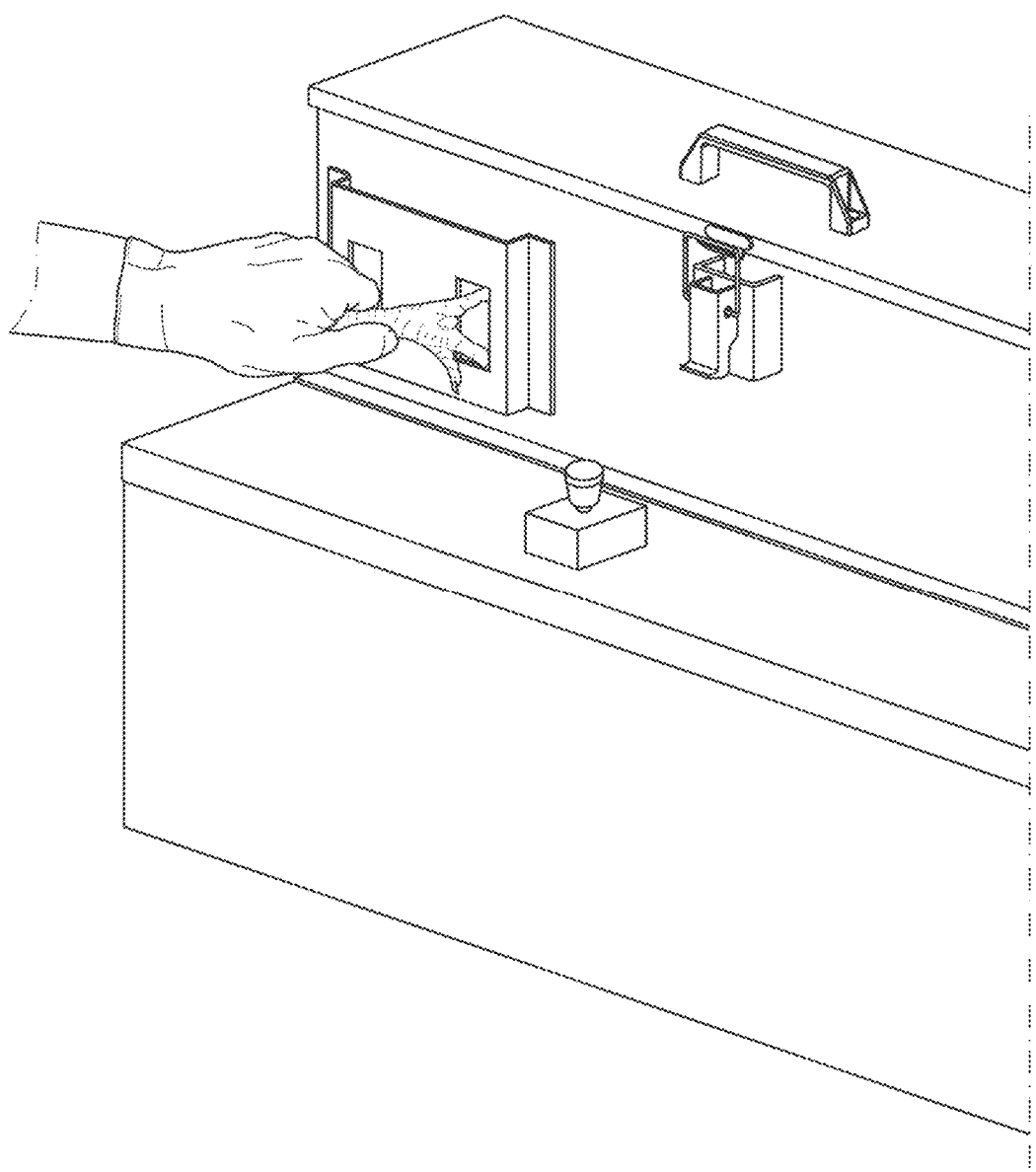
FIGS. 1 and 2 show examples of methods and equipment known from the state of the art used for the removal of tissue injured by pododermatitis in poultry paws.
Figure 2:
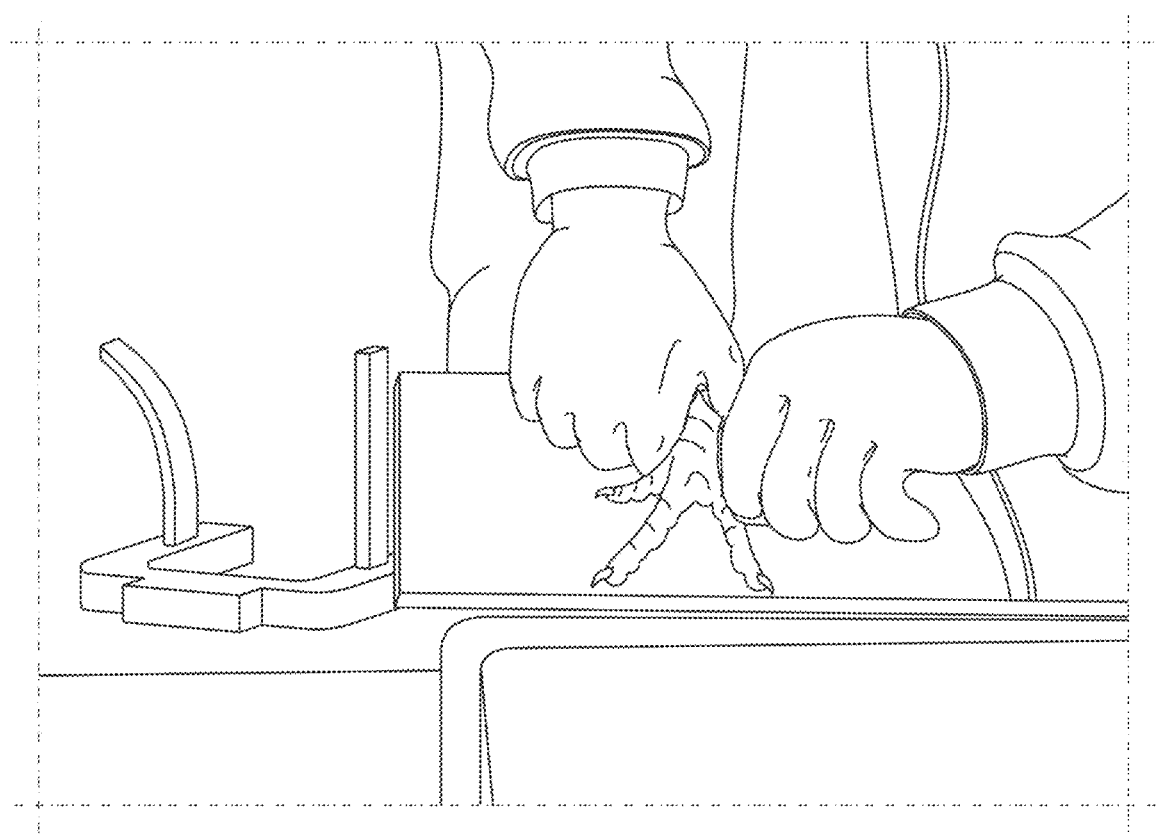
Figure 3:
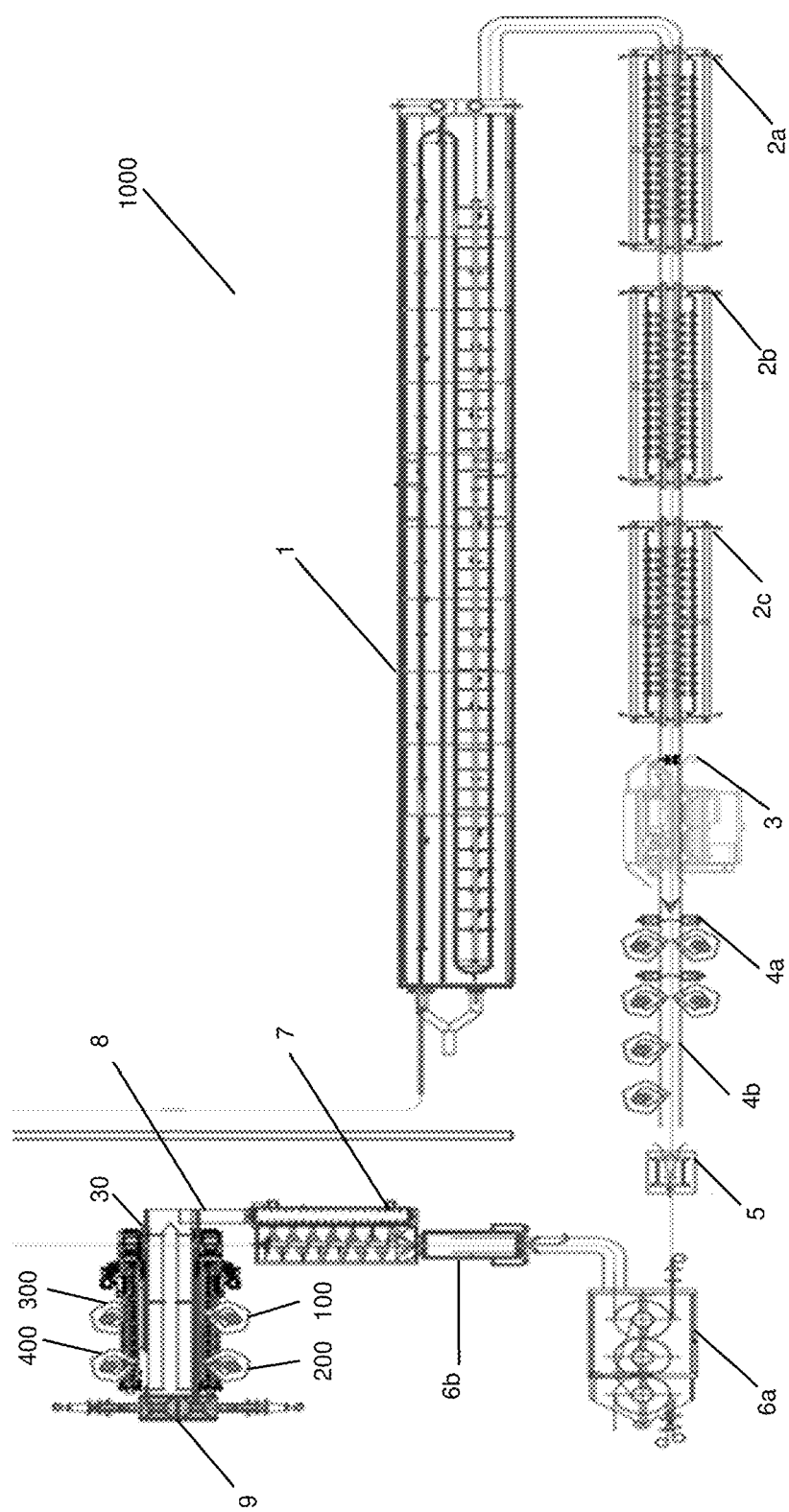
FIG. 3 illustrates a schematic upper view for an installation 1000 for the processing of broiler chickens comprising the modular equipment 30 according to the present invention.

As can be seen from FIG. 3, the modular equipment 30 in accordance with one embodiment of the present invention, can be adapted to an existing processing line of broiler chickens, such as an installation 1000.

The installation 1000, for example, comprises several other equipment individually destined to execution of specific steps for the processing of specific parts of broiler chickens.

In the exemplary installation 1000, the scalding step is performed by means of the three-pass scalding tank 1 and succeeds the steps of hanging, stunning and bleeding, or slaughter, of the broiler chickens. In this step, the broiler chickens are immersed in drinking water heated and agitated in counterflow, at a temperature that usually varies from 50 to 63° C. for a period which ideally varies between 45 to 180 seconds, depending on the form of scalding needed; hard/harsh, sub/medium, or soft/semi scalding.

After the three-pass scalding, the broiler chickens are plucked by means of pickers 2a, 2b, 2c.

Subsequently, while the broiler chickens are still tied to the overhead conveyor belt, the exemplary installation 1000 can include a step of pre-processing the poultry paws, with the purpose of removing the cuticle and the tissue affected by pododermatitis.

For this purpose, several equipment for the processing of poultry paws can be applied, such as the equipment ILPS-1 (In-line paw scrubber) 3 commercialized by Prime Equipment Group Inc.

In this sense, it is important to highlight that the modular equipment 30, object of the present invention, can be applied in installations 1000 which already hold equipment destined for removal of tissue affected by pododermatitis. In this case, the modular equipment 30 can subsequently be applied to the processing of poultry paws which require rework to remove the tissue affected by pododermatitis.

However, in another embodiment, it must be noted that the modular equipment 30 can further be applied in installations 1000 which do not have any prior step of processing poultry paws for removal of the issue affected by pododermatitis. Therefore, it is important to emphasize that the modular equipment 30, object of the present invention is also capable of acting in an independent manner in the processing of poultry paws.

Next, the birds of cut are submitted to evisceration and cleaning, or washing 4a, resulting in the poultry carcass, which is additionally inspected 4b to remove possible viscera residues or foreign bodies.

Next, the heads of the broiler chickens are removed by means of the head remover 5, and the broiler chickens are conducted to the protractor 6a wherein there occurs the separation of the paws from the remainder of the carcass of the broiler chickens.

Subsequently, the poultry paws are conducted to the paw cutter 6b, wherein there occurs the step of unhanging the paws from the conveyor belt for subsequent processing thereof.

Next, the poultry paws are scalded and skinned when submitted to the scalder and paw skinner 7, and subsequently conducted to the modular equipment 30 by means of the paw transfer table 8.

Figure 4:
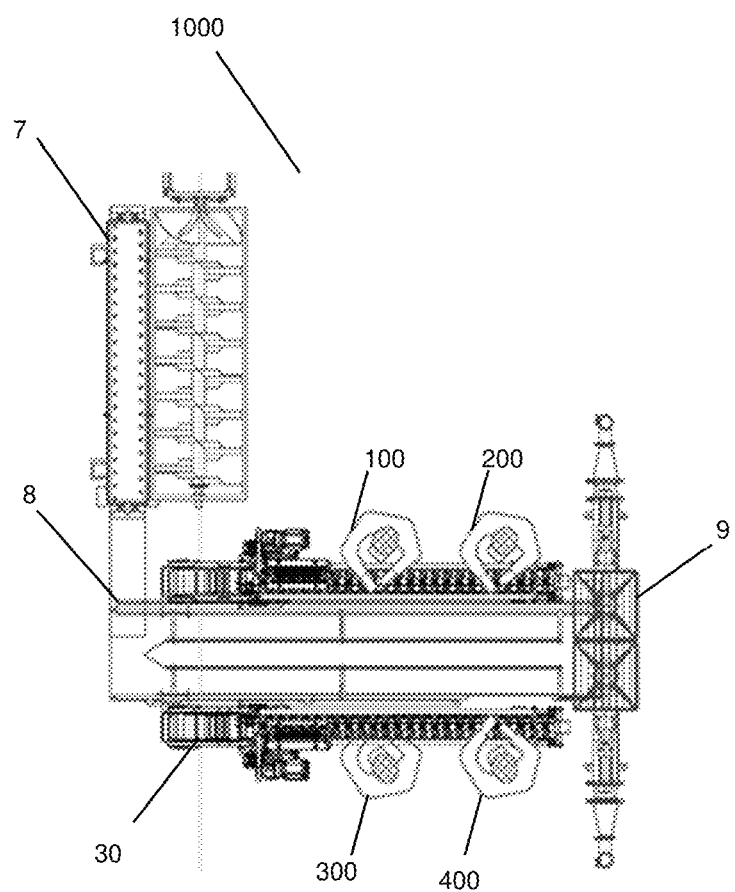
FIG. 4 illustrates an enlargement of the schematic upper view of the installation 1000 for the processing of broiler chickens illustrated by FIG. 3, comprising the modular equipment 30 according to the present invention.

As can be seen in more details from FIG. 4, in one embodiment the modular equipment 30 can be configured to receive one or more operators 100, 200, 300, 400 to operate the modular equipment 30. However, it can be conceived by a person skilled in the art that the modular equipment 30 can hold any number of operators, depending on the forms of embodiment of the modular equipment 30, which will be discussed ahead, or even no operator at all, depending on one embodiment wherein the modular equipment 30 can be fully automated.

Subsequently to the processing by means of the modular equipment 30, the poultry paws are directed to a vacuum system 9.

Figure 5:
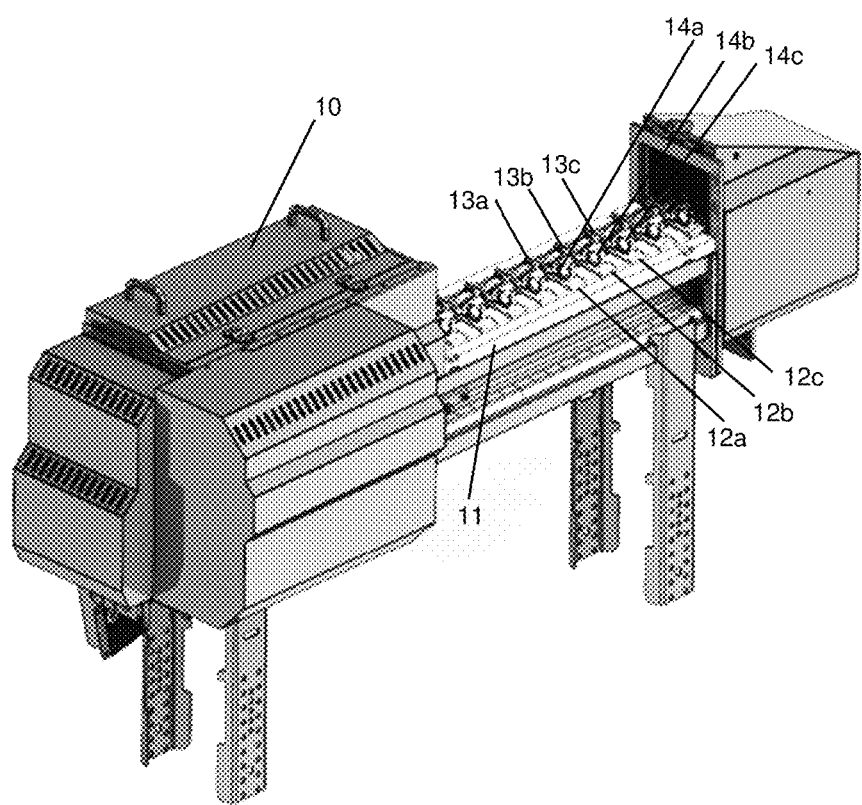
FIG. 5 illustrates a perspective view of the lower module 10, according to one embodiment of the present invention.

As can be seen from FIG. 5, in one embodiment, the modular equipment 30 has at least one lower module 10 which comprises a conveyor belt 11, over which is found a plurality of recesses 12a, 12b, 12c which can be mechanically associated to the conveyor belt 11. The recesses 12a, 12b, 12c are spaced apart by an equivalent minimum distance, whereby each recess 12a, 12b, 12c comprises a set of at least two fasteners linearly located along each recess 12a, 12b, 12c and spaced apart by an equivalent minimum distance.

Each recess 12a, 12b, 12c of the plurality of recesses 12a, 12b, 12c is configured to receive a proximal part 13a, 13b, 13c which comprises the poultry paws 14a, 14b, 14c to be processed. In an embodiment in which the proximal parts are received in casings 13a, 13b, 13c, the casings have a cylindrical shape, and are configured to firmly surround the poultry paws 14a, 14b, 14c, specifically by the shin, while allowing the distal part of the paws 14a, 14b, 14c, specifically, the region of the foot pad and digital pads, to remain free.

In this sense, the proximal parts 13a, 13b, 13c and the poultry paws 14a, 14b, 14c are received by the plurality of recesses 12a, 12b, 12c by means of the set of at least two fasteners, which firmly fasten the proximal parts 13a, 13b, 13c and a section of the poultry paws 14a, 14b, 14c.

In the embodiment in which the proximal parts are received in the casings 13a, 13b, 13c, the operators 100, 200, 300, 400 can be responsible for the insertion of the poultry paws 14a, 14b, 14c in the respective casings 13a, 13b, 13c, and subsequently, for the insertion thereof in the set of at least two fasteners of each recess 12a, 12b, 12c.

In yet a further embodiment, this step can be carried out by means of automation, waiving the need for operators 100, 200, 300, 400.

Additionally, the conveyor belt 11 is moved by means of a first conventional engine, whereby the conveyor belt 11 forecasts means to selectively adjust the speed thereof. Further, the conveyor belt 11 can comprise straight, curved conveyor belts and any other configuration which allows the adaptation and implementation thereof in installations 1000 that have limitations in the workspace.

Further, the plurality of recesses 12a, 12b, 12c comprises a first set of sprinkler nozzles configured to sanitize the plurality of recesses 12a, 12b, 12c.

Figure 6:
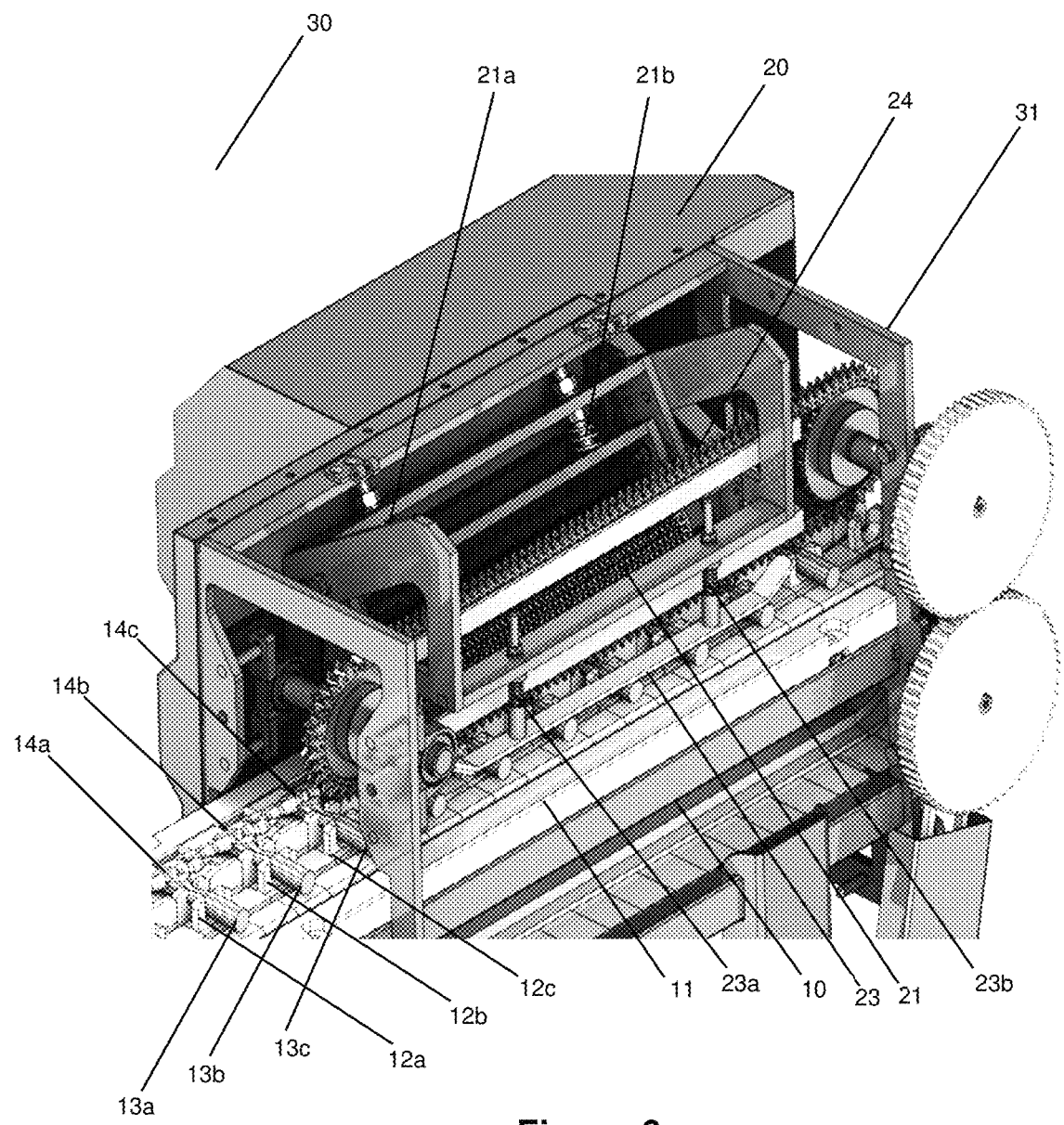
FIG. 6 illustrates a perspective view of the modular equipment 30 according to the present invention, comprising the lower module 10 and the upper module 20 according to one embodiment of the present invention.
Figure 7:
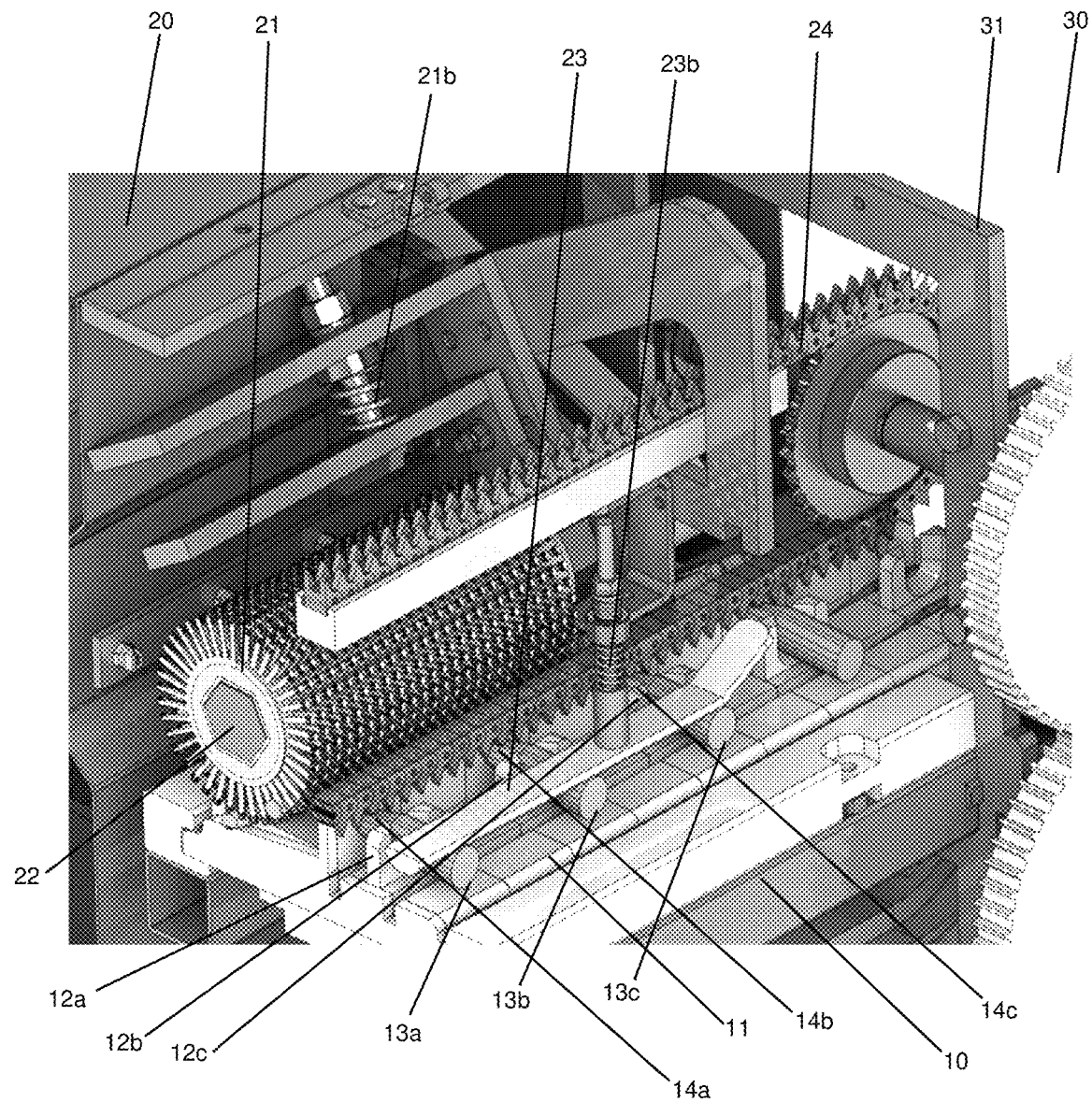
FIG. 7 shows section details of a perspective view of the modular equipment 30 illustrated in FIG. 6.

As can be seen by means of FIG. 6, and further, in another embodiment, the modular equipment 30 is comprised by the junction of at least one lower module 10 and at least one upper module 20, being mechanically associated by means of at least one support 31, which fastens the upper module 20 to the sides of the lower module 10.

The at least one upper module 20 comprises a set of bactericidal bristles 21 associated with a rotative axis 22, wherein the set of bactericidal bristles 21 is constituted by a plurality of disks with a number of bactericidal bristles, preferably 48, around their outer diameters. The bactericidal property is due to the material of which the bristles are made, such as PA 6 (polyamide 6). The hardness of the bristles is approximately 72 Shore. Each disk has a central orifice with an inner diameter that enables the association thereof, around the rotative axis 22, preferably made of 304 stainless steel. In one embodiment, the rotative axis 22 and the central orifices of each disk have hexagonal shape, however, any other shapes can be adopted. In this embodiment, the bactericidal bristles 21 have an outer diameter of approximately 120 millimeters and the rotative axis 22 has a length of approximately 400 millimeters and a width of 42 millimeters.

In turn, the rotative axis 22 is associated with the upper module 20 by means of a first structure, which receives the ends of the rotative axis 22 by means of bearings or similar means and a first set of tension springs 21a, 21b positioned in the first structure.

Additionally, the rotative axis 22 is moved by means of a second conventional motor, whereby the rotative axis 22 predicts means to selectively adjust the rotation speed thereof.

Further, the set of bactericidal bristles 21 comprises a second set of sprinkle nozzles, configured to sanitize the set of bactericidal bristles 21.

The at least one upper module 20 further comprises a stabilizer set comprising a stabilizer support 23 and a stabilizer teeth chain 24. The stabilizer support 23 has an oblong shape, being configured to be positioned directly above the proximal parts 13a, 13b, 13c, wherein the stabilizer support 23 is associated with the upper module 20 by means of a second structure and a second set of tension springs 23a, 23b positioned at each end of the stabilizer support 23, connecting same to the second structure.

The stabilizer teeth chain 24 is mechanically associated to two straight tooth cylindrical gears, whereby one is a driving gear and the other is a driven gear. The stabilizer chain is associated with the upper module 20 by means of two rotative axes, each rotative axis being associated to the straight tooth cylindrical gears. The stabilizer teeth of the stabilizer teeth chain 24 are radially configured outwards, while the stabilizer teeth chain 24 is configured to be positioned directly above the sections of poultry paws 14a, 14b, 14c.

In this embodiment, the set of bactericidal bristles 21 associated with the rotative axis 22 is positioned behind the stabilizer set, and therefore, behind the second structure. Said configuration advantageously allows the stabilizer set to be configured to avoid direct contact between the one or more operators 100, 200, 300, 400 and the set of bactericidal bristles 21 in rotation, which increases the safety of the operation of the modular equipment 30.

Additionally, the stabilizer set is configured to avoid the ejection of the poultry parts 14a, 14b, 14c when the distal part thereof comes into contact with the set of bactericidal bristles 21 in rotation, since the stabilizer support 23 and the stabilizer teeth 24 are configured to be in contiguity with the proximal parts 13a, 13b, 13c and the sections of the poultry paws 14a, 14b, 14c, respectively, while the conveyor belt 11 moves.

The set of tension springs 21a, 21b, 23a, 23b is further configured to adapt the processing of the poultry parts 14a, 14b, 14c with different sizes, while allowing the adjustment of the distance of the set of bactericidal bristles 21 and the stabilizer support 23 up to the poultry parts 14a, 14b, 14c and the proximal parts 13a, 13b, 13c, respectively.

The modular equipment 30 is further configured for the continuous flow of the processing of the poultry parts 14a, 14b, 14c, since, in this embodiment, the torque generated by the first conventional motor that drives the conveyor belt 11 is transmitted through a transmission by straight tooth cylindrical gears up to the driving gear of the stabilizer teeth chain 24, which maintains both the conveyor belt 11 as the stabilizer teeth chain 24 operating in the same speed.

Finally, the modular character of the equipment of the present invention advantageously allows greater flexibility and versatility in the manner of construction of the modular equipment 30, since it is possible to obtain a left or right assembly configuration, which provides adaptation to different installations 1000.

Although the description of the particular embodiments above relates to certain embodiments, the present invention can present modifications in the manner of implementation thereof so the scope of protection of the invention is limited only by the contents of the attached claims, including therein the possible equivalent variations.

In this regard, FIGS. 8 to 13 show another embodiment of:
conveyor belt 11, which has been labeled as 111;
recesses 12a, 12b and 12c which have been labeled as 112a, 112b and 112c; and
stabilizer teeth chain 24, which in this embodiment is a stabilizer link chain which has been labeled as 124.

The recesses 112a, 112b and 112c serve the same function as recesses 12a, 12b and 12c, but are constructed somewhat differently. In this regard, the recesses 112a, 112b and 112c each have an upwardly open curved receiving channel 140 to receive the proximal part 13a, 13b, 13c of the poultry paws 14a, 14b and 14c. The curved receiving channels flare outwardly in the direction away from the bristles 21 to define a lead-in 142 to the channels 140.

The recesses 112a, 112b and 112c, in the direction away from the lead-in 142 include extendable tongues 144 that are located just below the base of the channels 140 to serve as a shelf or support the help keep the poultry paws 14a, 14b and 14c or poultry feet (i.e, the poultry paws without the metatarsal bone) aligned with a channel and do not fall out of the channel before being held in place by the stabilizer link chain 124. The tongues 144 are slidably received in slots 145 formed in and extending horizontally through the recesses 112a, 112b and 112c. See FIGS. 11 and 13.

As shown in FIGS. 8, 11, 13 and 14, the opposite ends of the tongues 144 extend outwardly from the recesses 112a, 112b and 112c to define tapering tabs 146 for receiving a pin 147 that extends upwardly from a track 148 formed in the conveyor 111. A bearing 149 is attached to the bottom of the pin 147 to smoothly ride along the interior of the track 148. See FIG. 13.

Figure 8:
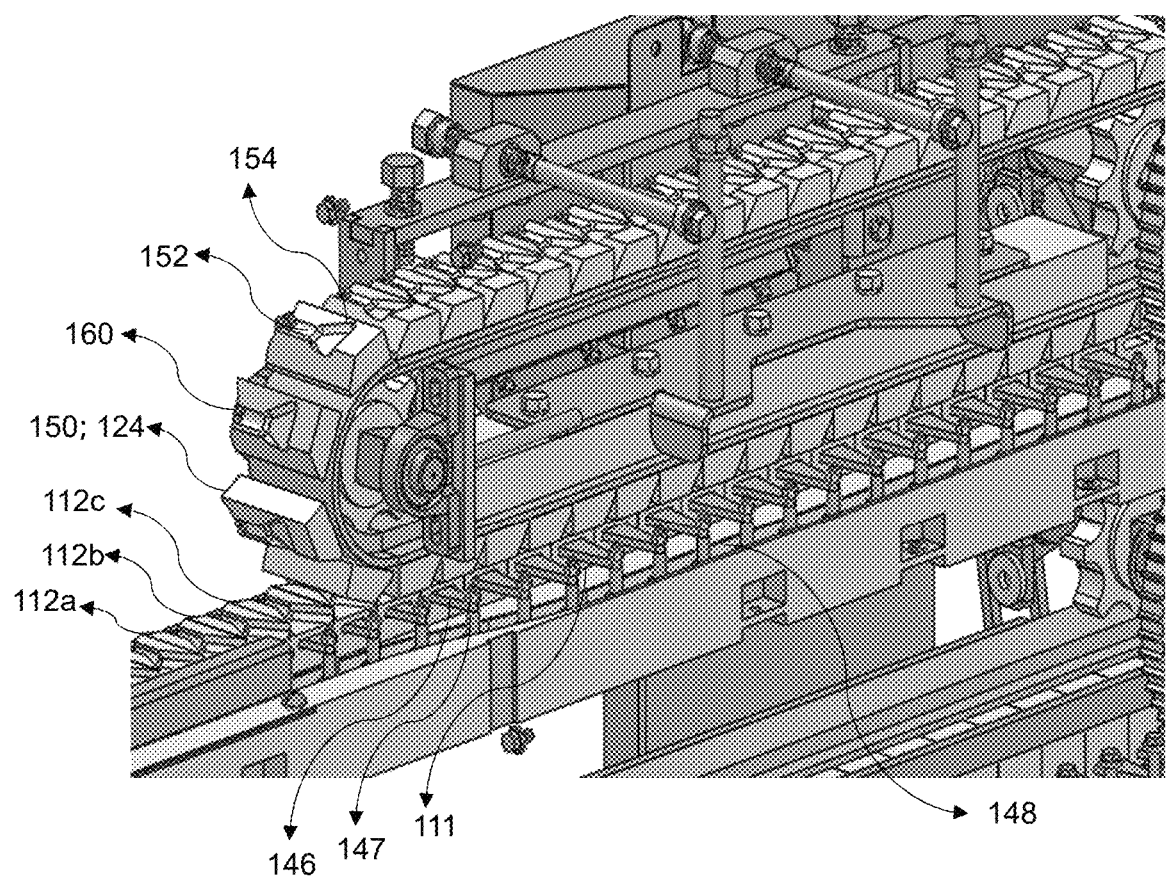
FIG. 8 illustrates a perspective view of an alternative embodiment of a stabilizer link chain 124, conveyor belt 111 and recesses 112a, 112b, 112c.

In a preferred embodiment, the track 148 extends parallel to the recesses 112a, 112b, and 112c. The track 148 is positioned relative to the recesses 112a, 112b and 112c so that, except in the area of the bristles 21, the tongues 144 are extended from the recesses 112a, 112b and 112c to support and stabilize the poultry paws 14a, 14b and 14c/or poultry feet. However, as shown in FIG. 8 in the vicinity of the bristles 21, the track is located further away from the recesses 112a, 112b and 112c so that the tongues 144 are recessed into the recesses 112a, 112b and 112c thereby allowing the bristles 21 to have access to the paws 14a, 14b and 14c/or feet for processing. In this regard, see FIG. 9. Once the recesses 112a, 112b and 112c pass beyond the bristles 21, the tongues 144 are again extended outwardly by the pushing action of the pins 147 so that the tongues 144 can again support and stabilize the poultry paws 14a, 14b and 14c/or poultry feet when loaded into the recesses 112a, 112b and 112c.

In this preferred embodiment, the tongue 144 is selectively retractable and extendable by the interaction between the tab 146 and a shape of the track 148.

The links 150 of the stabilizer link chain 124 have a channel portion 152 that correspond in shape and size with the channels 140 of the recesses 112a 112b and 112c. The channels 140 and 152 cooperate to receive the proximal parts 13a, 13b, 13c of the poultry paws 14a, 14b and 14c therein, In the links 150, the channel portions 152 flair outwardly at 154 to correspond to the size and shape of the lead-in 142 of the recesses 112a, 112b and 112c.

Figure 9:
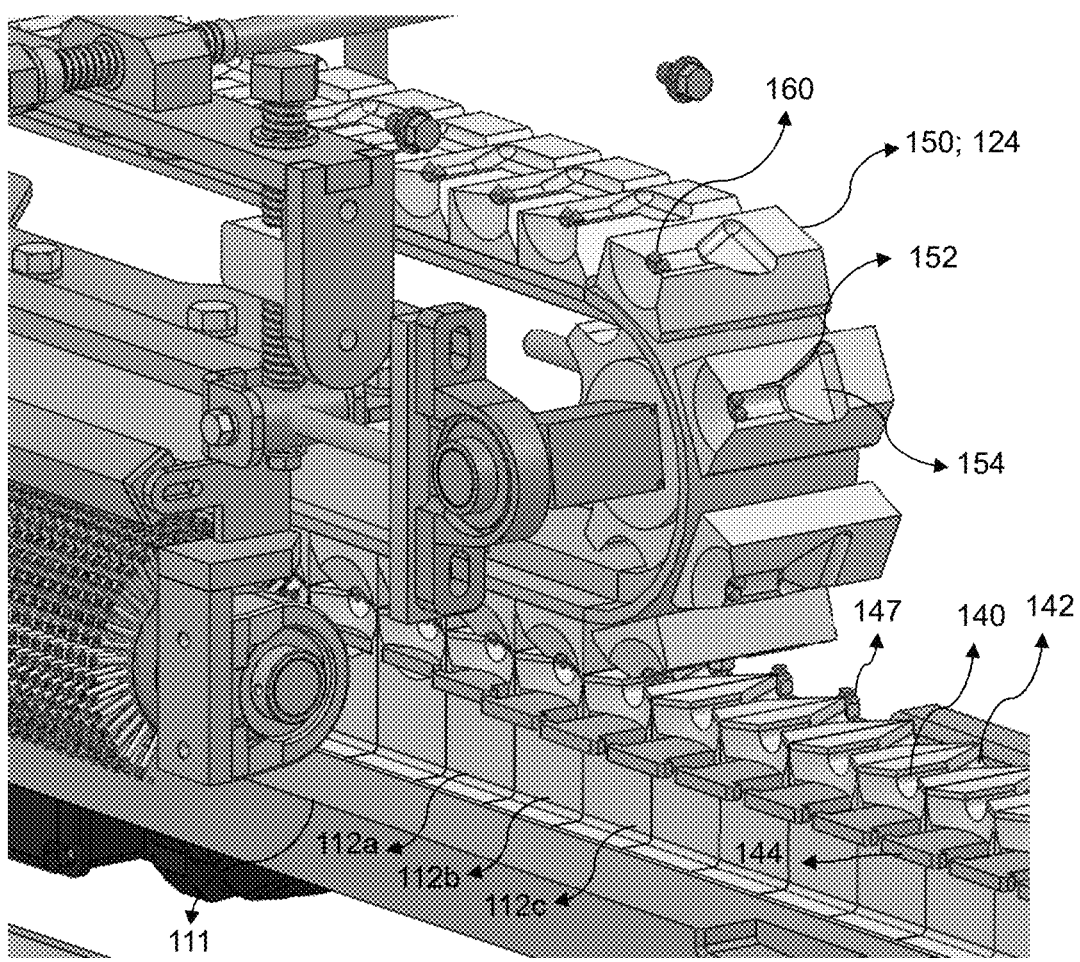
FIG. 9 is a perspective view of the stabilizer link chain 124, conveyor belt 111 and recesses 112a, 112b, 112c, but taken from the opposite side of the stabilizer link chain 124, conveyor belt 111 and recesses 112a, 112b, 112c, then shown in FIG. 8.
Figure 10:
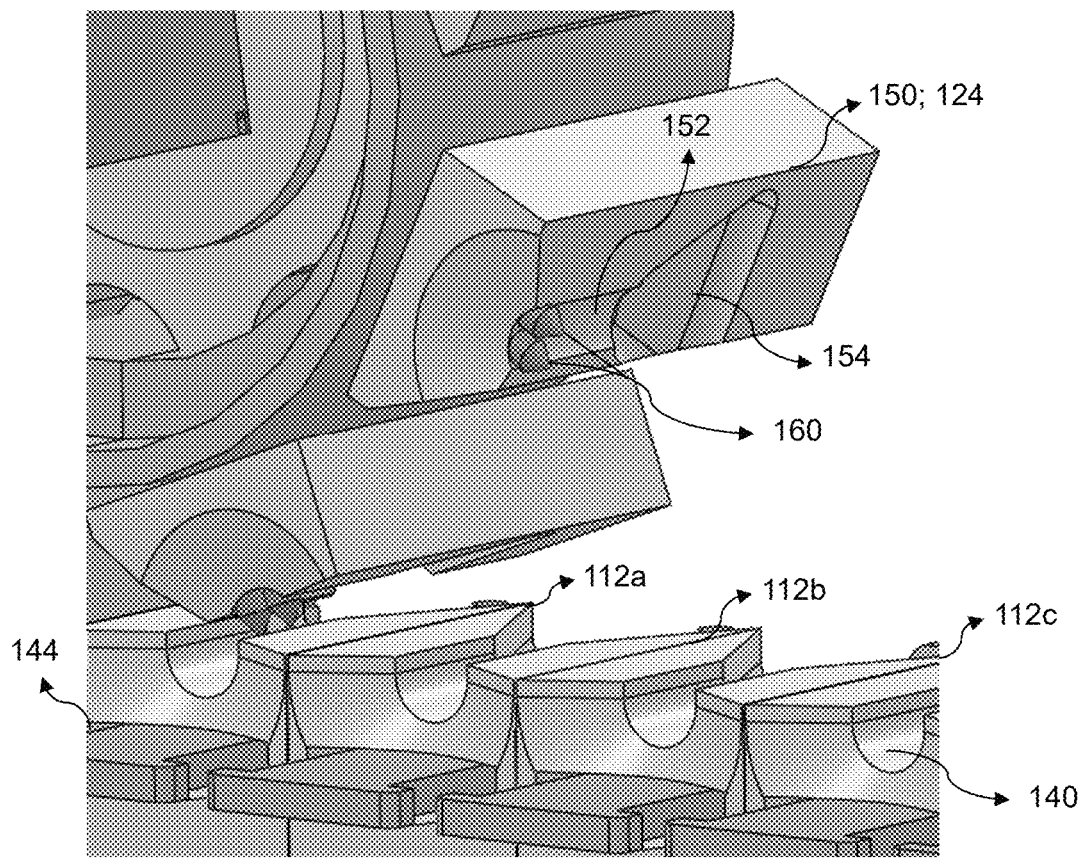
FIG. 10 is an enlarged perspective view of a portion of FIG. 9.
Figure 11:
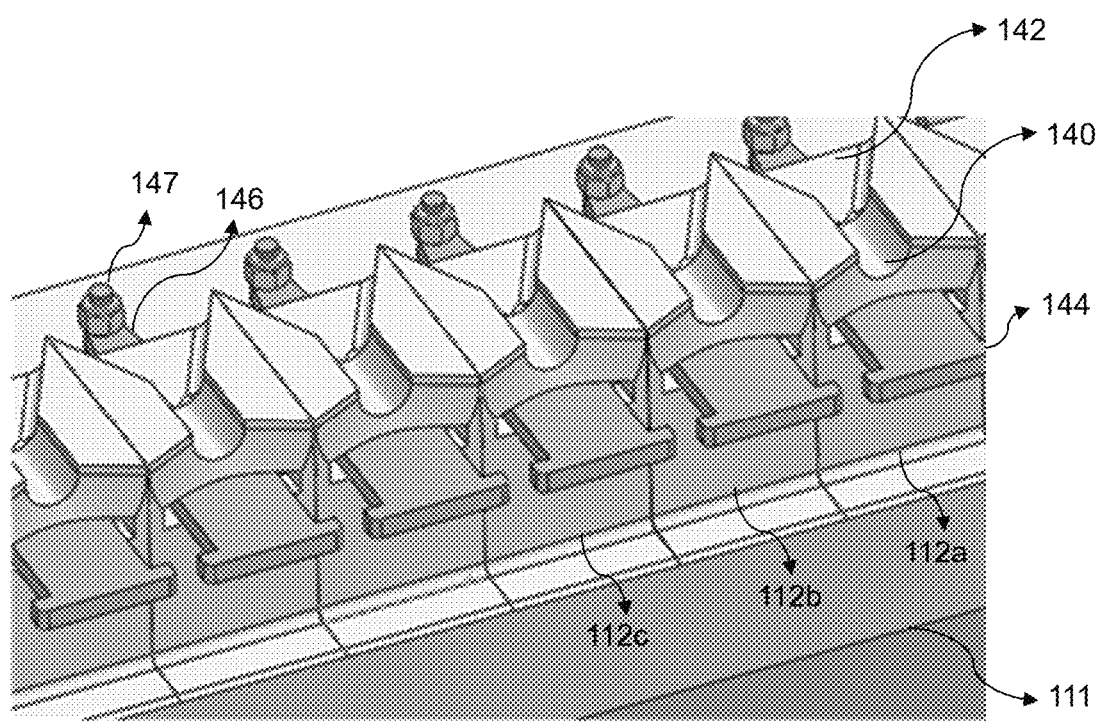
FIG. 11 is an enlarged perspective view of the conveyor belt 111 and recesses 112a, 112b, 112c.
Figure 12:
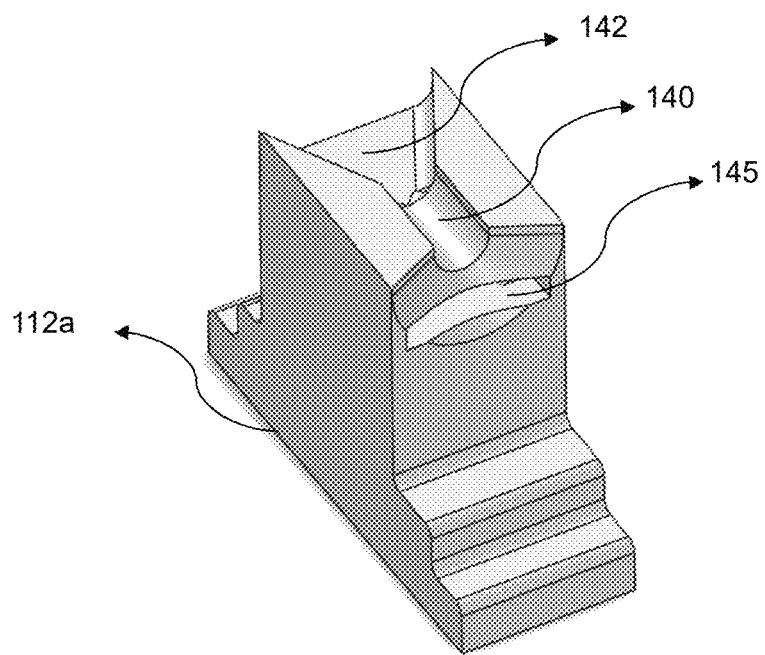
FIGS. 12, 13 and 14 are enlarged perspective views of the recesses 112a, 112b, 112c.
Figure 13:
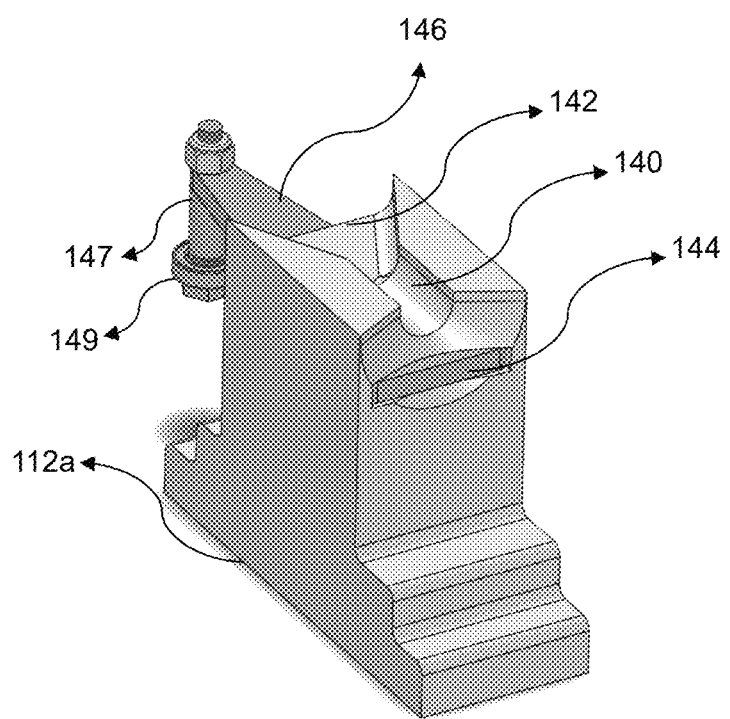
Figure 14:
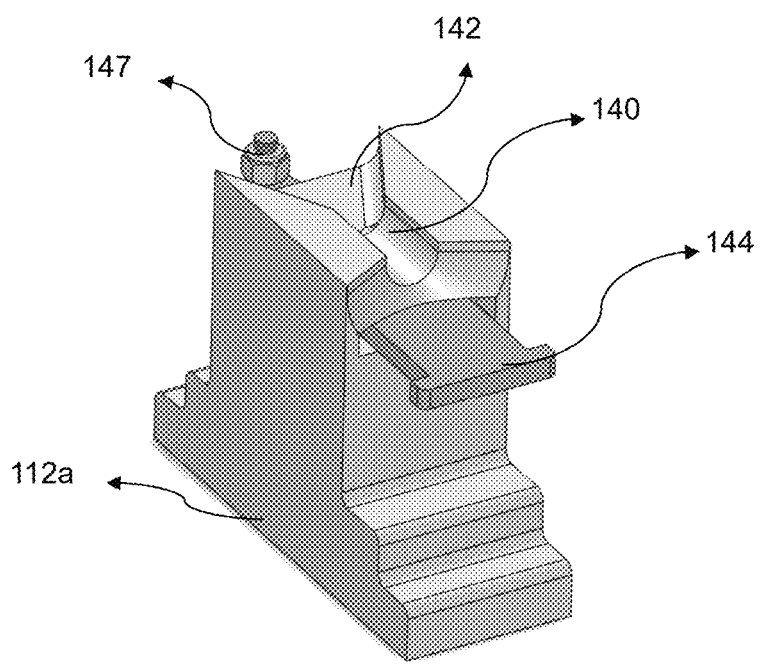

As shown in FIGS. 8 to 10, a pair of side-by-side resilient buttons or snubbers 160 extend from the base of the channel portions 152. These buttons/snubbers 160 function to hold the poultry paws 14a, 14b and 14c within the recesses 112a, 112b and 112c when the links 150 of the stabilizer link chain 124 mate with a corresponding recess 112a, 112b and 112c. The resilient material from which the buttons/snubbers 160 are constructed is able to hold the poultry paws 14a, 14b and 14c in place without damaging the poultry paws 14a, 14b and 14c.

It is to be understood that the embodiment of FIGS. 8 to 13 may eliminate the need to use the stabilizer support 23. As such the construction of the equipment 30 may be simplified.

Figure 15:
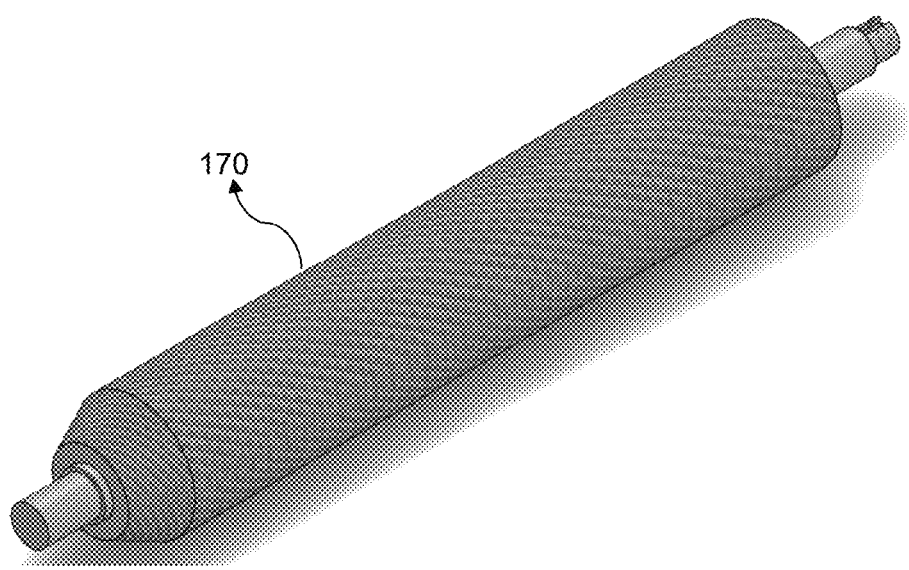
FIG. 15 is a perspective view of a knurled roller 170 for callus removal.

FIG. 15 illustrates an alternative embodiment of a callus remover roller 170 that can be used in place of or along with the bacterial bristles 21. The roller 170 can be constructed of 304 stainless steel and formed with a knurled outer surface. The external diameter of the roller can be 80 mm and with a length of 455 mm in the callus removal area. The knurled outer surface can be formed with channels every 2.70 mm of pitch between one another at an angle of 30 degrees and with a depth of 1.85 mm.

Of course, the knurled outer surface can be of other dimensions.

| Parts Listing | |
|---|---|
| Installation | 1000 |
| Scalding tank | 1 |
| Pickers | 2a to 2c |
| ILPS-1 | 3 |
| Evisceration, cleaning and washing | 4a |
| Inspection | 4b |
| Head remover | 5 |
| Protractor | 6a |
| Paw cutter | 6b |
| Paw skinner | 7 |
| Paw transfer table | 8 |
| Equipment | 30 |
| Operators | 100 to 400 |
| Vacuum system | 9 |
| Lower module | 10 |
| Upper module | 20 |
| Conveyor | 11 |
| Recesses | 12a to 12b |
| proximal part | 13a to 13c |
| Poultry part | 14a to 14c |
| First set of tension springs | 21a, 21b |
| Second set of tension springs | 23a, 23b |
| Set of bristles | 21 |
| Stabilizer support | 23 |
| Support | 31 |
| Rotative axis | 22 |
| Stabilizer teeth chain | 24 |
| Conveyor | 111 |
| Recesses | 112a to 112b |
| Channel | 140 |
| Lead in | 142 |
| Tongue | 144 |
| Slot | 145 |
| Tab | 146 |
| Pin | 147 |
| Conveyor slot | 148 |
| Bearing | 149 |
| Stabilizer link chain | 124 |
| Link of the stabilizer link chain | 150 |
| Channel portion of the link | 152 |
| Flared portion of the link | 154 |
| Snubber/button | 160 |
| Knurled roller | 170 |

The invention claimed is:

1. Equipment for processing poultry parts comprising:
 a scrubbing device for processing poultry parts, the scrubbing device associated with a rotative axis;
 a longitudinal conveyor belt moving relative to the scrubbing device, comprising:
 a plurality of upwardly open recesses carried by the conveyor belt,
 each recess being configured to receive a proximal part of the poultry part in an orientation transverse to the length of the conveyor belt, while allowing for a distal part of the poultry parts to be processed, to remain free to be processed by the scrubbing device; and
 a support associated with the recesses to support and retain the poultry part within the recess.

2. The equipment according to claim 1, wherein the support comprises a stabilizer bar positioned in contiguity with the proximal part and pressed against the proximal part by springs.

3. The equipment according to claim 1, further comprising a first set of sprinkle nozzles directed at the plurality of recesses and configured to sanitize the plurality of recesses.

4. The equipment according to claim 1, wherein the support comprising a stabilizer teeth chain associated with the equipment by means of two rotative axes.

5. The equipment according to claim 4, wherein the stabilizer teeth of the chain are configured radially outwards and being positioned in contiguity with the section of the free distal part.

6. The equipment according to claim 1, wherein first and second sets of tension springs allow for a distance adjustment of the scrubbing device and the stabilizer in relation to the free distal parts and the proximal parts, respectively.

7. The equipment according to claim 1, wherein the support comprising a tongue associated with each recess for supporting the distal part of the poultry part.

8. The equipment according to claim 7, wherein the tongue is slidably received in a slot formed in and extending horizontally through the recess.

9. The equipment according to claim 8, wherein the tongue comprises a tab at one end for receiving a pin emerging from a track formed in the conveyor belt.

10. The equipment according to claim 9, wherein the tongue is selectively retractable and extendable by the interaction between the tab and a shape of the track.

11. The equipment according to claim 7, wherein each recess comprises a receiving channel to receive the proximal part of the poultry part the channel flaring outwardly in a direction away from the scrubbing device and defining a lead-in to the channel.

12. The equipment according to claim 1, wherein the support comprises a stabilizer chain comprising links positioned in contiguity with the proximal part of the poultry parts.

13. The equipment according to claim 12, wherein each link of the stabilizer chain has a channel portion having a flared region corresponding, respectively, to a receiving channel and a lead-in of each recess.

14. The equipment according to claim 12, wherein at least one snubber is provided in each link for holding the proximal part of the poultry part when the links of the stabilizer chain and the recesses mate.

15. The equipment according to claim 1, wherein the scrubbing device comprises a set of bristles that are mounted to rotate about an axis when processing the poultry part.

16. The equipment according to claim 15, wherein the set of bristles is made of polyamide 6 and has bactericidal properties.

17. A method for processing poultry feet, the method comprising:
 inserting a proximal part of poultry feet into an upwardly open recess of a conveyor belt while allowing a distal part of the poultry feet to remain free;
 positioning a stabilizer support in proximity to the proximal part of the poultry feet to stabilize and retain the poultry feet proximal part relative to the recess; and
 removing pododermatitis-affected tissues from the free distal part of the poultry feet by a set of rotating bristles or a rotating scrubber roller.

18. The method according to claim 17, wherein the method further comprises performing at least one step selected from the group consisting of:
 adjusting a distance of the set of bristles or the rotating scrubber roller and the stabilizer support in relation to the free distal part and the proximal part respectively of the poultry feet;

sanitizing the recess by means of a first set of sprinkle nozzles; and directing the processed poultry feet to a vacuum system.

19. A method for processing poultry feet comprising:
inserting a proximal part of poultry feet into upwardly open recesses of a conveyor belt while allowing a distal part of the poultry feet to remain free;
stabilizing the poultry feet while being held in the recesses by selectively retracting and extending a tongue in the recesses for supporting the free distal part of the poultry feet; and
removing pododermatitis-affected tissues from the free distal part of the poultry feet by means of a set of bristles or a scrubber roller.

20. The method according to claim 19, wherein the method further comprises one or more steps selected from the group consisting of:
adjusting a distance of the set of bristles or the scrubber roller in relation to the free distal part of the poultry feet;
sanitizing the recesses by means of a first set of sprinkle nozzles; and
directing the processed poultry feet to a vacuum system.

21. A method for processing poultry feet comprising:
inserting the proximal part of poultry feet into upwardly open recesses of a conveyor belt while allowing a distal part of the poultry feet to remain free;
positioning links of a stabilizer chain to be in proximity to the proximal part of the poultry feet; and
removing pododermatitis-affected tissues from the free distal part of the poultry feet by means of a set of bristles or a scrubber roller.

* * * * *